US012476826B2

(12) United States Patent
Pettit

(10) Patent No.: US 12,476,826 B2
(45) Date of Patent: Nov. 18, 2025

(54) GENERATING DIGITAL SIGNATURES

(71) Applicant: nChain Licensing AG, Zug (CH)

(72) Inventor: Michaella Pettit, London (GB)

(73) Assignee: nChain Licensing AG, Zug (CH)

( * ) Notice: Subject to any disclaimer, the term of this patent is extended or adjusted under 35 U.S.C. 154(b) by 40 days.

(21) Appl. No.: 18/682,085

(22) PCT Filed: Jul. 11, 2022

(86) PCT No.: PCT/EP2022/069261
§ 371 (c)(1),
(2) Date: Feb. 7, 2024

(87) PCT Pub. No.: WO2023/016730
PCT Pub. Date: Feb. 16, 2023

(65) Prior Publication Data
US 2025/0016008 A1 Jan. 9, 2025

(30) Foreign Application Priority Data
Aug. 9, 2021 (GB) ...................................... 2111442

(51) Int. Cl.
*H04L 29/06* (2006.01)
*H04L 9/32* (2006.01)
(52) U.S. Cl.
CPC ................................ *H04L 9/3255* (2013.01)
(58) Field of Classification Search
CPC ...... H04L 9/3255; H04L 9/085; H04L 9/3239; H04L 9/50; H04L 9/3247
See application file for complete search history.

(56) References Cited

U.S. PATENT DOCUMENTS 7,246,232 B2  7/2007 Dutertre
8,144,874 B2  3/2012 McGough
(Continued)

FOREIGN PATENT DOCUMENTS

JP  2007124032 A  5/2007
JP  2008199278 A  8/2008
(Continued)

OTHER PUBLICATIONS

Dikshit P., et al., "Efficient Weighted Threshold ECDSA for Securing Bitcoin Wallet," 2017 ISEA Asia Security and Privacy (ISEASP), IEEE, Jan. 29, 2017, pp. 1-9, DOI: 10.1109/ISEASP.2017.7976994.
(Continued)

*Primary Examiner* — Harunur Rashid
(74) *Attorney, Agent, or Firm* — Messner Reeves LLP

(57) ABSTRACT

A computer-implemented method of proving that a target sub-group generated a digital signature, wherein the group is divisible into a plurality of unique sub-groups, each sub-group comprising at least the threshold number of participants. The method comprises: for each sub-group to which the first participant belongs, generating a first ephemeral private key share, wherein each other participant of each respective sub-group generates a respective ephemeral private key share; for each respective shared ephemeral private key, generating a respective shared ephemeral public key; generating a first signature share of the signature based on a first private key share, the first ephemeral private key share of a target one of the respective shared ephemeral private keys, and a message; and making the first signature share available to a coordinator for generating the signature.

12 Claims, 3 Drawing Sheets

(56) References Cited

U.S. PATENT DOCUMENTS

| | | | |
|---|---|---|---|
| 8,806,197 | B2 | 8/2014 | Struik et al. |
| 9,813,244 | B1 | 11/2017 | Triandopoulos et al. |
| 9,894,151 | B2 | 2/2018 | Dhuse et al. |
| 10,211,981 | B2 | 2/2019 | Camenisch et al. |
| 10,511,436 | B1 | 12/2019 | Machani |
| 10,764,043 | B2 | 9/2020 | Traynor et al. |
| 10,903,991 | B1* | 1/2021 | Craige .................. H04L 9/085 |
| 11,323,267 | B1 | 5/2022 | Griffin et al. |
| 11,481,761 | B2 | 10/2022 | Lam |
| 11,563,567 | B2 | 1/2023 | Le Saint |
| 11,637,708 | B2 | 4/2023 | Hung |
| 11,973,867 | B2 | 4/2024 | Tysor et al. |
| 12,309,196 | B2 | 5/2025 | Pettit |
| 2002/0116611 | A1* | 8/2002 | Zhou .................. H04L 9/3263 713/176 |
| 2003/0009694 | A1 | 1/2003 | Wenocur et al. |
| 2003/0059041 | A1 | 3/2003 | MacKenzie et al. |
| 2010/0037055 | A1 | 2/2010 | Fazio et al. |
| 2011/0138192 | A1 | 6/2011 | Kocher et al. |
| 2012/0254619 | A1 | 10/2012 | Dhuse et al. |
| 2014/0164769 | A1 | 6/2014 | D'Souza |
| 2014/0325309 | A1 | 10/2014 | Resch |
| 2015/0100781 | A1 | 4/2015 | Yann et al. |
| 2015/0288525 | A1 | 10/2015 | Camenisch et al. |
| 2017/0223008 | A1 | 8/2017 | Camenisch et al. |
| 2017/0250972 | A1 | 8/2017 | Ronda et al. |
| 2018/0060248 | A1 | 3/2018 | Liu et al. |
| 2018/0074889 | A1 | 3/2018 | Resch et al. |
| 2018/0101697 | A1 | 4/2018 | Rane et al. |
| 2018/0183601 | A1 | 6/2018 | Campagna et al. |
| 2018/0212772 | A1 | 7/2018 | Leavy et al. |
| 2018/0307573 | A1 | 10/2018 | Abraham et al. |
| 2018/0349867 | A1 | 12/2018 | Trieflinger |
| 2018/0351754 | A1 | 12/2018 | Wallrabenstein et al. |
| 2019/0007205 | A1 | 1/2019 | Corduan et al. |
| 2019/0280864 | A1 | 9/2019 | Cheng et al. |
| 2019/0370792 | A1 | 12/2019 | Lam |
| 2019/0372759 | A1 | 12/2019 | Rix |
| 2020/0044863 | A1* | 2/2020 | Yadlin .................. G06F 9/54 |
| 2020/0074450 | A1 | 3/2020 | Fletcher et al. |
| 2020/0145231 | A1 | 5/2020 | Trevethan |
| 2020/0153640 | A1 | 5/2020 | Ranellucci |
| 2020/0169391 | A1 | 5/2020 | Kapp et al. |
| 2020/0213099 | A1* | 7/2020 | Wright .................. H04L 9/3236 |
| 2020/0213113 | A1* | 7/2020 | Savanah .................. H04L 9/085 |
| 2020/0259638 | A1 | 8/2020 | Carmignani et al. |
| 2020/0259651 | A1 | 8/2020 | Mohassel et al. |
| 2020/0311678 | A1 | 10/2020 | Fletcher et al. |
| 2020/0353167 | A1 | 11/2020 | Vivek et al. |
| 2021/0049600 | A1 | 2/2021 | Spector |
| 2021/0067345 | A1 | 3/2021 | Shamai et al. |
| 2021/0089676 | A1* | 3/2021 | Ford .................. H04L 9/0825 |
| 2021/0090072 | A1 | 3/2021 | Sewell et al. |
| 2021/0352054 | A1 | 11/2021 | Urian |
| 2021/0359843 | A1 | 11/2021 | Li et al. |
| 2021/0377049 | A1 | 12/2021 | Nix |
| 2022/0172180 | A1 | 6/2022 | Komiyama |
| 2022/0182235 | A1 | 6/2022 | Tysor et al. |
| 2022/0239509 | A1 | 7/2022 | Jang et al. |
| 2022/0286276 | A1 | 9/2022 | Li et al. |
| 2022/0311623 | A1 | 9/2022 | Tomlinson |
| 2022/0321340 | A1 | 10/2022 | Tsitrin |
| 2023/0066711 | A1 | 3/2023 | Wright et al. |
| 2023/0361993 | A1 | 11/2023 | Camenisch et al. |
| 2024/0054206 | A1 | 2/2024 | Belgarric et al. |

FOREIGN PATENT DOCUMENTS

| | | |
|---|---|---|
| JP | 2013513312 A | 4/2013 |
| JP | 2015194959 A | 11/2015 |
| JP | 2018005089 A | 1/2018 |
| WO | 9937052 A1 | 7/1999 |
| WO | 2015160839 A1 | 10/2015 |
| WO | 2017145010 A1 | 8/2017 |
| WO | 2018189656 A1 | 10/2018 |
| WO | 2019034951 A1 | 2/2019 |
| WO | 2019034986 A1 | 2/2019 |
| WO | 2019158209 A1 | 8/2019 |
| WO | 2019193452 A1 | 10/2019 |
| WO | 2019246206 A1 | 12/2019 |
| WO | 2020084418 A1 | 4/2020 |
| WO | 2021213959 A1 | 10/2021 |
| WO | 2021254702 A1 | 12/2021 |
| WO | 2023072502 A1 | 5/2023 |

OTHER PUBLICATIONS

International Search Report and Written Opinion for International Application No. PCT/EP2022/076636, mailed Jan. 20, 2023, 12 pages.

Hideyuki F., et al., "Updating Method of Distributed Data in Secret Sharing System," Research Report of Computer Security (CSEC), Japan, Information Processing Society of Japan, May 15, 2014, vol. 2014-CSEC-65, No. 1, pp. 1-6, 10 pages.

Shingu T., et al., "Updating Method of Verifiable Distributed Data in the Secret Sharing Scheme," Japan, Information Processing Society of Japan, Nov. 28, 2014, vol. 2014-CSEC-67, No. 5, pp. 1-6, 9 pages.

Cachin Christian, "Security and Fault-tolerance in Distributed Systems—Distributed Cryptography", Dec. 31, 2012 (Dec. 31, 2012), XP055903112, Retrieved from the Internet: URL: https://cachin.com/cc/sft12/distcrypto.pdf, sections 7.2, 7.3, 7.4.

Combined Search and Examination Report for Application No. GB2009062.7, mailed on Mar. 12, 2021, 10 pages.

Combined Search and Examination Report under Sections 17 and 18(3) for Application No. GB2011686.9, mailed on Apr. 22, 2021, 10 pages.

Combined Search and Examination Report under Sections 17 and 18(3) for Application No. GB2017103.9 mailed on Jun. 28, 2021, 13 pages.

Combined Search and Examination Report under Sections 17 and 18(3) for Application No. GB2105992.8 mailed on Jan. 17, 2022, 9 pages.

Combined Search and Examination Report under Sections 17 and 18(3) for Application No. GB2111440.0 mailed on Jan. 25, 2022, 6 pages.

Combined Search Report under Sections 17 for Application No. GB2111442.6 mailed on Jan. 25, 2022, 4 pages.

Damgard I., et al., "Fast Threshold ECDSA with Honest Majority", Aug. 23, 2020, Computer Vision—ECCV2020: 16TH European Conference, Proceedings; Part of the Lecture Notes in Computer Science, 35 pages.

Denis Kolegov et al: "Towards Threshold Key Exchange Protocols", Arxiv.org, Cornell University Library, 201 Olin Library Cornell University Ithaca, NY 14853, Dec. 27, 2020 (Dec. 27, 2020), XP081849900, section 2.2.

Fornaro D., "Elliptic Curve Hierarchical Deterministic Private Key Sequences: Bitcoin Standards and BestPractices," Master Thesis, Apr. 19, 2018, retrieved from the URL: https://www.politesi.polimi.it/bitstream/10589/140112/1/2018_04_Fornaro.pdf, 53 pages.

GB2101590.4 Combined Search and Examination Report dated Jul. 30, 2021, 7 pages.

Gennaro R., et al., "Fast Multiparty Threshold ECDSA with Fast Trustless Setup," Proceedings of the 2018 ACM SIGSAC Conference on Computer and Communications Security, Oct. 2018, pp. 1179-1194.

Gennaro R., et al., "Robust Threshold DSS Signatures," International Conference on the Theory and Applications of Cryptographic Techniques, 1996, EUROCRYPT '96 pp. 354-371.

Gennaro R., et al., "Robust Threshold DSS Signatures," International Conference on the Theory and Applications of Cryptographic Techniques, 2001, vol. 164, pp. 54-84.

Goldfeder S., et al., "Securing Bitcoin Wallets via Threshold Signatures," 2014, retrieved from the URL: https://www.cs.princeton.edu/stevenag/bitcoin_threshold_signatures.pdf, sections "Threshold ECDSA Signature Generation" and "Threshold Deterministic Address Derivation", 11 pages.

(56) References Cited

OTHER PUBLICATIONS

International Search Report and Written Opinion for Application No. PCT/EP2021/062941, mailed on Aug. 3, 2021, 14 pages.
International Search Report and Written Opinion for Application No. PCT/EP2021/076686 mailed on Feb. 14, 2022, 17 pages.
International Search Report and Written Opinion for Application No. PCT/EP2022/058085 mailed on Jul. 26, 2022, 14 pages.
International Search Report and Written Opinion issued in International Application No. PCT/EP2021/067673, mailed on Sep. 28, 2021, 13 pages.
Joonsang Baek et al: "Simple and efficient threshold cryptosystem from the gap diffie-hell ma n group", GLOBECOM '03. 2003-IEEE Global Telecommunications Conference. Conference Proceedings. San Francisco, CA, Dec. 1-5, 2003; [IEEE Global Telecommunications Conference] New York, NY, vol. 3, Dec. 1, 2003 (Dec. 1, 2003), pp. 1491-1495.
Luzio A.D., et al., "Arcula: A Secure Hierarchical Deterministic Wallet for Multi-asset Blockchains," Section 2, Dec. 10, 2019, 33 pages.
PCT/EP2022/050116 International Search Report and Written Opinion dated Apr. 26, 2022, 14 pages.
Pettit M. "Shared Secrets and Threshold Signatures," May 1, 2020, [retrieved on Jun. 14, 2021], pp. 1-23, Retrieved from the Internet: URL: https://nakasendoproject.org/Threshold-Signatures-whitepaper-nchain.pdf, sections 4 and 5; p. 22.
Pramanik S., et al., "VPSS: A Verifiable Proactive Secret Sharing Scheme in Distributed Systems," IEEE Military Communications Conference, Milcom, Oct. 13, 2003, vol. 2, pp. 826-831, XP010698401, DOI: 10.1109/MILCOM.2003.1290219, ISBN: 978-0-7803-8140-7.
Wuille P., "BIP 32: Hierarchical Deterministic Wallets," Github Bitcoin BIPs, Feb. 2012, 6 pages, Retrieved from the Internet: URL: https://en.bitcoin.it/wiki/BIP_0032, Retrieved on Aug. 24, 2020.
International Search Report and Written Opinion for Application No. PCT/EP2022/069246 dated Nov. 3, 2022, 15 pages.
Combined Search and Examination Report under Sections 17 and 18(3) for Application No. GB2111441.8 mailed on Jan. 25, 2022, 6 pages.
Ewa Syta et al: "Keeping Authorities "Honest or Bust" with Decentralized Witness Cosigning", 2016 IEEE Symposium On Security and Privacy (SP) , May 1, 2016 (May 1, 2016), pp. 526-545.
Boldyreva A., et al., "Threshold Signatures, Multisignatures and Blind Signatures Based on the Gap-diffie-hellman-group Signature Scheme," International Workshop on Public Key Cryptography, Berlin, Heidelberg: Springer Berlin Heidelberg, 2003, 16 pages.
Camenisch J., et al., "Short Threshold Dynamic Group Signatures," International conference on security and cryptography for networks Cham: Springer International Publishing, 2020, pp. 401-423.

\* cited by examiner

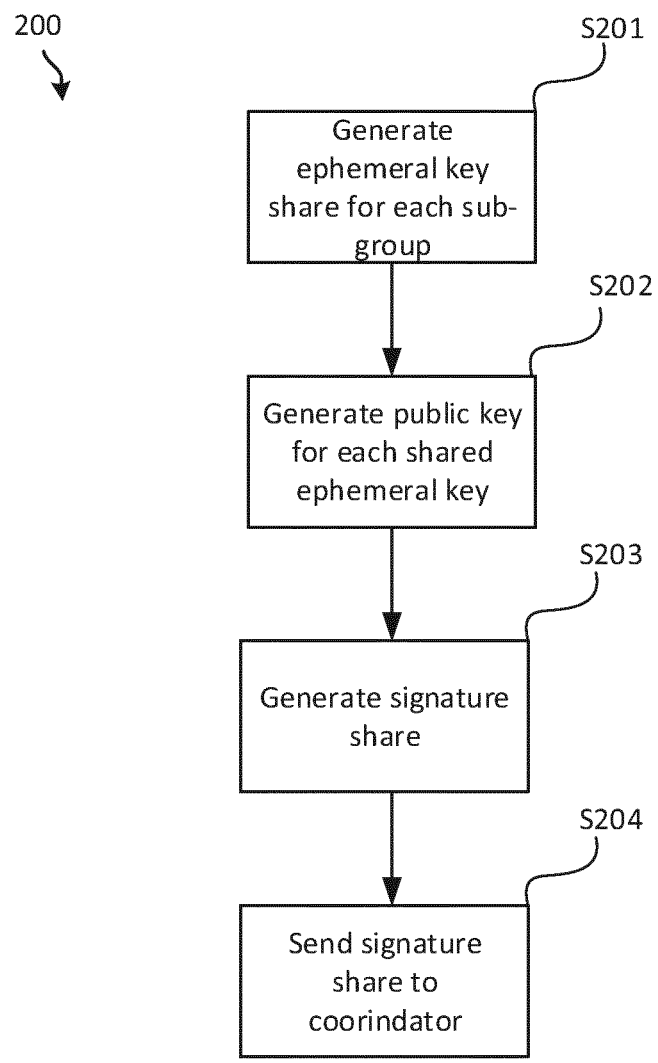

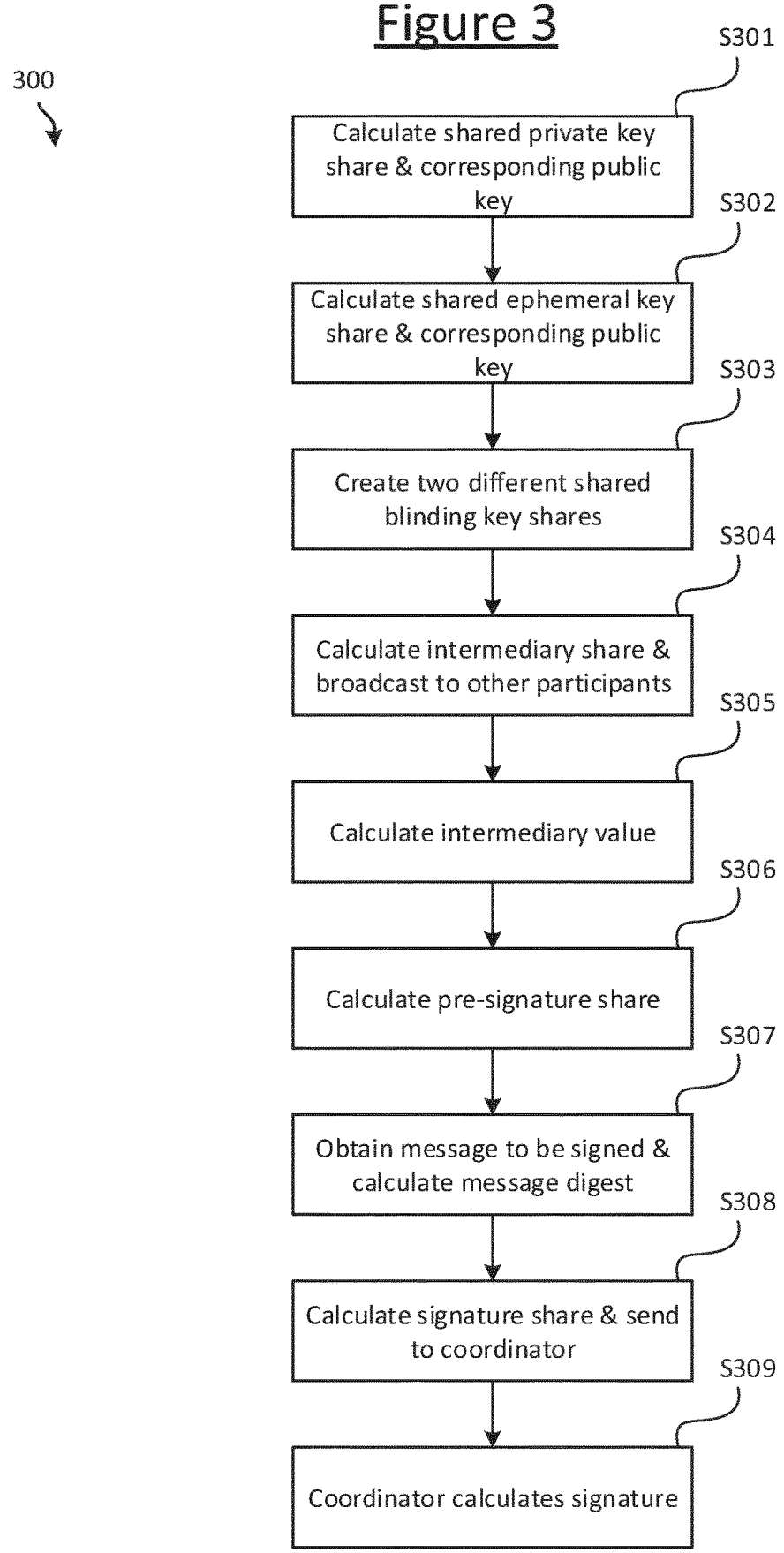

GENERATING DIGITAL SIGNATURES

CROSS REFERENCE TO RELATED APPLICATIONS

This application is the U.S. National Stage of International Application No. PCT/EP2022/069261 filed on Jul. 11, 2022, which claims the benefit of United Kingdom Patent Application No. 2111442.6, filed on Aug. 9, 2021, the contents of which are incorporated herein by reference in their entireties.

TECHNICAL FIELD

The present disclosure relates to a method of generating a digital signature and to a method proving that a participant contributed a share of the digital signature.

BACKGROUND

In general, a shared secret may be used to share a data item that is distributed amongst a group of participants. Each participant has a different share of the secret. Normally, the secret can only be reconstructed when a certain number (referred to as the "threshold") of participants make their respective shares available, e.g. to be combined together to calculate the secret.

Public-key cryptography is a type of cryptographic system that uses pairs of keys: private keys which are known only to the owner of the private key, and public keys which are generated based on the corresponding private key and which may be disseminated without compromising the security of the private key.

Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature based on the message. Creating a digital signature based on a message means supplying the message and private key to a function that generate the signature based on both the message and private key. The signature is added to (e.g. tagged onto) the message or otherwise associated with the message. Anyone with the signer's corresponding public key can use the same message and the digital signature on the message to verify whether the signature was validly created, i.e. whether the signature was indeed made using the signer's private key. As well as ensuring the authenticity of a message, digital signatures also ensure the integrity and non-repudiation of the message. That is, a digital signature can be used to prove that a message has not been changed since it was signed with the signature, and that the creator of a signature cannot deny in the future that they created the signature.

A digital signature scheme typically involves three procedures, i.e. algorithms. A key generation algorithm is used to generate a random private key and a corresponding public key. A signing algorithm is used to generate a signature based on a message and the private key. A verification algorithm is used to verify, given a public key and the message, whether the signature has been generated using the corresponding private key and according to the signing algorithm.

A common use of a shared secret is as a shared private key of a private-public key pair. That is, the private key may be distributed amongst a group of participants such that no single participant has access to the private key. Therefore no single participant can generate a valid signature of a message. Instead, some or all of the participants must together generate the private key in order for the signature to be generated.

Instead of the participants sharing their private key shares in order to generate a signature, they may instead use a threshold signature scheme. A threshold signature scheme allows a threshold number of participants in a group to create a digital signature based on a message using individual shares of a shared private key, without the private key being made available to any one participant. Here, a digital signature is a signature which is generated based on the message to be signed. In such a scheme, the signature can only be created if the threshold number of participants agree to generate the signature on the message. Any attempt to generate a signature using a smaller number of participants will not generate a valid signature. Therefore, a valid signature by the group (i.e. one generated using the message and the shared private key) provably had the threshold number of people agree to generate the signature. This also implies that any adversary needs to obtain the threshold number of shares of the private key to forge a signature with that private key.

SUMMARY

As mentioned above, threshold signature schemes require participants to contribute respective signature shares in order to generate a valid signature. Whilst a valid signature proves that at least a threshold number of participants contributed a signature share, it does not prove which participants of the group contributed a signature share. In other words, in a threshold signature scheme, there is no way to identify who has created a given signature—the resulting signature will always be the same no matter which shares were used to create it. There is therefore a need for a threshold signature scheme which allows signers (i.e. participants that contribute to the signature) to be able to prove that they have indeed contributed a signature share. Such a scheme could be used to prevent other participants falsely claiming that they have contributed to the signature, or that the proving party has not contributed to the signature.

According to one aspect disclosed herein, there is provided a computer-implemented method, performed by a first participant of a group of a participants, of proving that a target sub-group of the group generated a digital signature, wherein the signature can only be generated based on at least a threshold number of respective signature shares, wherein each participant of the group has a respective private key share of a shared private key, wherein the group is divisible into a plurality of unique sub-groups where each sub-group comprises at least the threshold number of participants, and wherein the method comprises: for each respective sub-group to which the first participant belongs, generating a respective first ephemeral private key share of a respective shared ephemeral private key, wherein each other participant of each respective sub-group generates a respective ephemeral private key share of the respective shared ephemeral private key; for each respective shared ephemeral private key, generating a respective shared ephemeral public key; generating a first signature share of the signature, wherein the first signature share is generated based on a first private key share of the shared private key, the first ephemeral private key share of a target one of the respective shared ephemeral private keys, and a message; and making the first signature share available to a coordinator for generating the signature based on at least the threshold number of respective signature shares, wherein each respective signature share is based on respective private key share of the shared private key and a respective ephemeral private key share of the target one of the respective shared ephemeral private keys, and wherein the signature comprises a component based on the respective shared ephemeral public key corresponding to the target one of the respective shared ephemeral private keys.

Each participants of the group have a shared of the same shared private key for generating a threshold signature. The signature can only be generated with a minimum number of unique signature shares. This number is known as the threshold of the signature. The group divides itself into all possible unique sub-sets (i.e. sub-groups), where each sub-set is at least the same size as the threshold of the signature such that each sub-set could generate enough signature shares to generate a valid signature. A sub-set may have more participants than needed. Each different sub-set derives shares of a different shared ephemeral key. A participant that is a member of multiple sub-sets will therefore derive a share of multiple ephemeral keys, one for each sub-set. The sub-sets also derive a corresponding ephemeral public key. When a sub-set wishes to generate a signature, the participants of that sub-set generate respective signature shares using their shares of the ephemeral key derived by that sub-set. Since the signature includes a component based on the corresponding ephemeral public key, the participants of the sub-set that derived the signature can prove that they did indeed derive the signature since only they had access to the ephemeral key (i.e. the shares thereof) corresponding to the ephemeral public key upon which the component of the signature is based.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 2 is a flow diagram illustrating an example embodiment of the present invention, and FIG. 3 is a flow diagram illustrating an example signature generation method according to some embodiments of the present invention.

DETAILED DESCRIPTION OF EMBODIMENTS

1. Cryptographic Preliminaries

Figure 1:
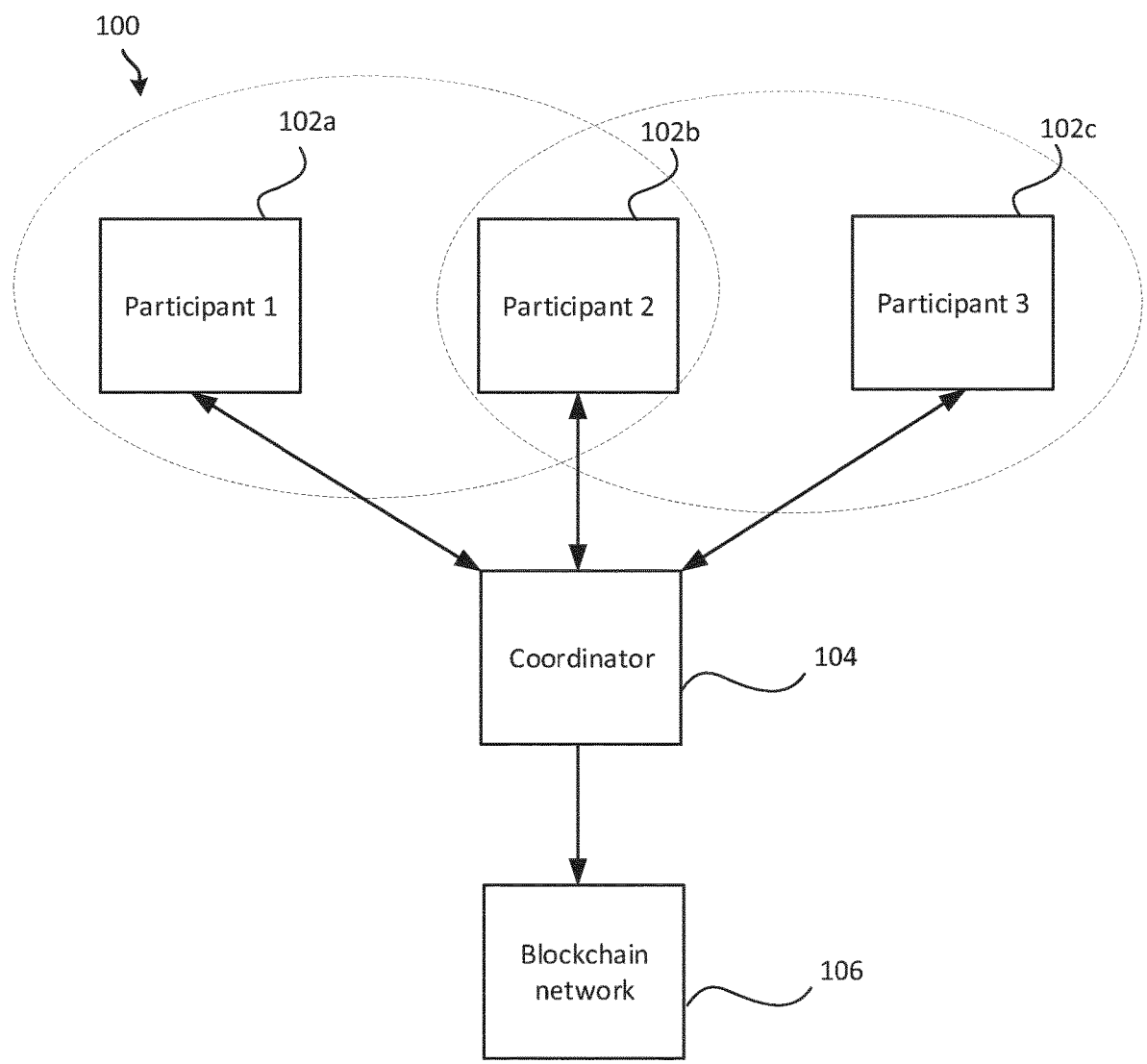
FIG. 1 is a schematic block diagram of a system for implementing embodiments of the present invention.

Whilst the following examples are described in terms of elliptic curve cryptography, the invention is not limited to any one particular cryptographic scheme and may in general be applied to any cryptographic scheme, e.g. RSA or other public key cryptography schemes.

1.1 Elliptic Curve Groups

An elliptic curve E satisfies the equation:

$$y^2 = x^3 + ax + b \mod p$$

where $a, b \in \mathbb{Z}_p$ and $a, b$ are constants satisfying $4a^3 + 27b^2 \neq 0$. The group over this elliptic curve is defined to be the set of elements $(x, y)$ satisfying this equation along with the point at infinity $\mathcal{O}$, which is the identity element. The group operation on the elements in this group is called elliptic curve point addition and denoted by +. This group is denoted by $E(\mathbb{Z}_p)$ and its order by n.

This group operation can be used to define another operation on the elements called point multiplication denoted by. For a point $G \in E(\mathbb{Z}_p)$ and a scalar $k \in \mathbb{Z}^*_n$, the point k·G is defined to be the point G added to itself k times.

In elliptic curve cryptography, a private key is defined to be a scalar $k \in \mathbb{Z}_n \setminus \{0\}$ where $\mathbb{Z}_n \setminus \{0\}$ is notation for the set $\{1, \ldots, n-1\}$, and the corresponding public key is the point k·G on an elliptic curve. For instance, in some blockchain protocols, the elliptic curve is chosen to be the secp256k1 elliptic curve, and the values a, b, and p are completely specified by this curve. The order n of this group has been calculated given these values, which in the case of this curve is a prime, and the secp256k1 standard also specifies a point G which is to be used as the generator of this group.

1.2 Elliptic Curve Digital Signature Algorithm

In order to create a signature on a message msg, with the private key a, the following steps are taken:

1. Calculate the message digest e=hash(msg), where may be any hash function. For instance, in some examples hash(msg)=SHA256(SHA256(msg)) where SHA256(■) is the SHA-256 hash function. Note that instead the message may be hashed only once, or more that two times with the same or different hash functions.
2. Chose a random integer $k \in \{1, \ldots, n-1\}$, where n is the order of the elliptic curve, e.g. the secp256k1 curve. In the following, k is referred to as the ephemeral private key.
3. Calculate the ephemeral public key corresponding to this ephemeral private key k·G=($R_x$, $R_y$).
4. Calculate r=$R_x$ mod n. If r=0, return to step 2.
5. Calculate the multiplicative inverse of the ephemeral key $k^{-1}$ mod n.
6. Calculate s=$k^{-1}$(e+ar) mod n. If s=0, return to step 2.
7. The signature on the message msg is (r, s).

The ephemeral key must be kept secret, otherwise the private key can be calculated, given a message and signature. Additionally, each time a signature is generated, a different ephemeral key must be used. If this is not the case, it is possible to derive the private key a given two different signatures and their corresponding messages.

Given a message msg, a public key P=a·G, and corresponding signature (r, s), then one can verify the signature by completing the following steps:

1. Calculate the message digest e=hash(msg), e.g. e=SHA256(SHA256(msg)).
2. Calculate the multiplicative inverse $s^{-1}$ of s modulo n.
3. Calculate $j_1$=$es^{-1}$ mod n and $j_2$=$rs^{-1}$ mod n.
4. Calculate the point Q=$j_1$·G+$j_2$·P.
5. If Q=$\mathcal{O}$, the point at infinity, the signature is invalid.
6. If Q≠$\mathcal{O}$, then let Q:=($Q_x$, $Q_y$), and calculate u=$Q_x$ mod n. If u=r, the signature is valid.

In threshold signature schemes, this private key a is split into key shares that are distributed amongst participants in a threshold scheme group.

1.3 Joint Verifiable Random Secret Sharing

Assume that N participants want to create a joint secret that can only be regenerated by at least (t+1) of the participants in the scheme. To create the shared secret, the following steps are taken:

1. The participants agree on the unique label i for each participant. Each participant i generates (t+1) random numbers $$a_{ij} \in_R \mathbb{Z}_n \setminus \{0\}, \forall j = 0, \ldots, t,$$

where $\in_R$ means a randomly generated element of the set $\mathbb{Z}_n \setminus \{0\}$ where $\mathbb{Z}_n \setminus \{0\}$ is notation for the set $\{1, \ldots, n-1\}$. Then each participant has a secret polynomial of order t $$f_i(x) = a_{i0} + a_{i1}x + \ldots + a_{it}x^t \bmod n,$$

for $i=1, \ldots, N$. Note that we omit the mod n notation from now on, and it is assumed that all arithmetic operations over integers are done modulo n.

2. Each participant i sends the value $f_i(j)$ to participant j e.g. using a secure communication channel with participant j only.
3. Each participant i calculates their own private secret share of a shared secret polynomial as $$a_i := \sum_{j=1}^{N} f_j(i).$$

A shared secret share is a point with the form $(i, a_i)$, where i is the participants label in the scheme. This method for creating a secret share of a, as described in steps 1-3, is denoted herein by $a_i$=JVRSS(i) for participant i. Note that "JVRSS" typically stands for "Joint verification random secret sharing" and includes steps 4 and 5 as well. However, throughout this document JVRSS is taken to mean performing at least steps 1 to 3, where steps 4 and 5 are optional steps.

Now that the participants have generated a shared polynomial, they can each verify that the other participants have shared the correct information to all participants, and that all participants have the same shared polynomial. This is done in the following way.

4. Each participant i broadcasts to all participants the obfuscated coefficients $$a_{ik} \cdot G,$$

for $k=0, \ldots, t$.

5. Each participant i checks that each participant j has correctly calculated the polynomial point $f_j(i)$ by calculating $f_j(i) \cdot G$ and verifying that $$f_j(i) \cdot G \stackrel{?}{=} \sum_{k=0}^{t} i^k (a_{jk} \cdot G) \ \forall j = 1, \ldots, N.$$

If all participants find that this equation holds for each polynomial, then the group can collectively be sure that they have all created the same shared polynomial.

1.4 Reconstructing a Shared Secret

Assume a participant wants to reconstruct a shared secret a which is the zeroth order of a shared polynomial. Given (t+1) points on this polynomial of the form $$(1, a_1), \ldots, ((t+1), a_{t+1}),$$

then to find the shared secret a, one calculates $$\text{interpolate}(a_1, \ldots, a_{t+1}) = \left( \sum_{l=1}^{t+1} a_l \prod_{\substack{1 \leq j \leq (t+1), \\ j \neq l}} (-j)(l-j)^{-1} \right) = a,$$

which is derived from a general formula known as "Lagrange Interpolation".

1.5 Public Key Calculation

Given the N zeroth-order private polynomial coefficient public keys $a_{i0} \cdot G$ for $j=1, \ldots, N$ shared in step 4 of JVRSS, each participant calculates the shared public key P using $$P = a \cdot G = \sum_{j=1}^{N} a_{j0} \cdot G,$$

corresponding to the shared secret a.

1.6 Addition of Shared Secrets

To calculate the addition of two shared secrets that are shared amongst a group of N participants, where each secret polynomial has order t, without any entity knowing the individual secrets, the following steps are taken:

1. Generate the first shared secret a, where participant i's share is given by $a_i$=JVRSS(i) for $i=1, \ldots, N$ with a threshold of (t+1).
2. Generate the second shared secret b, where participant i's share is given by $b_i$=JVRSS(i), with a threshold of (t+1).
3. Each participant i calculates their own additive share $$v_i = a_i + b_i \bmod n.$$

4. All participants broadcast their additive share $v_i$ to all other participants.
5. Each participant interpolates over at least (t+1) of the shares $v_i$ to calculate $$v = \text{interpolate}(v_1, \ldots, v_{t+1}) = a + b.$$

This method for the addition of shared secrets is denoted by ADDSS(i) for participant i, which results in each participant i knowing v=(a+b).

1.7 Product of Shared Secrets

To calculate the product of two shared secrets that are both shared amongst a group of N participants, where each secret polynomial has order t, the group takes the following steps:

1. Generate the first shared secret a, where participant i's share is given by $a_i$=JVRSS(i) for $i=1, \ldots, N$. The shared secret polynomial has order t, meaning (t+1) participants are required to recreate it.
2. Generate the second shared secret b, where participant i's share is given by $b_i$=JVRSS(i), and the shared secret polynomial again has order t.
3. Each participant calculates their own multiplicative share $\mu_i$ using $$\mu_i = a_i b_i.$$

4. All participants broadcast their multiplicative share $\mu_i$ to all other participants.

5. Each participant interpolates over at least (2t+1) of the shares $\mu_i$ at 0 to calculate $$\mu = \text{interpolate}(\mu_1, \ldots, \mu_{2t+1}) = ab.$$

This method for calculating the product of two shared secrets is denoted herein by $\mu=ab=\text{PROSS}(i)$ for participant i.

1.8 Inverse of a Shared Secret

In order to calculate the inverse of a shared secret a, the following steps are taken:
1. All participants calculate the product of shared secrets PROSS(i), the result of which is $\mu=ab \bmod n$.
2. Each participant calculates the modular inverse of $\mu$ which results in $$\mu^{-1} = (ab)^{-1} \bmod n.$$

3. Each participant i calculates their own inverse secret share by calculating $$a_i^{-1} = \mu^{-1} b_i.$$

This method for calculating the inverse of shared secrets is denoted by $a_i^{-1}=\text{INVSS}(i)$ for participant i.

1.9 Shared Private Key Generation and Verification

To calculate a shared private key a between $N \geq 2t+1$ participants, t+1 of which are required to create a signature, the participants execute JVRSS with a threshold of t+1 and public key calculation as described above. The result is that every participant $i=1, \ldots, N$ has a private key share $a_i$ and the corresponding shared public key $P=(a \cdot G)$.

1.10 Ephemeral Key Shares Generation

To generate ephemeral key shares and the corresponding r, as is required in a signature, a group of size N with a shared private key a of threshold (t+1) execute the following steps:
1. Generate the inverse share of a shared secret $k_i^{-1}=\text{INVSS}(i)$, where (t+1) shares are required to recreate it.
2. Each participant calculates $$(x, y) = \sum_{i=1}^{N} (k_{i0} \cdot G),$$

using the obfuscated coefficients shared in the verification of $k_i$, then they calculate $$r = x \bmod n.$$

3. Each participant i stores $(r, k_i^{-1})$.

1.11 Non-Optimal Signature Generation

Assume that at least 2t+1 participants would like to create a signature on a message, and one of the participants chooses to coordinate this. In order to create a signature by a group with the shared private key a, the following steps are taken.
1. The coordinator requests a signature on the message from at least 2t+1 participants.
2. Each participant i recovers the ephemeral key $(r, k_i^{-1})$ calculated in the previous section. All users must use a share corresponding to the same ephemeral key.

3. Each participant calculates the message digest $e=\text{SHA-256}(\text{SHA-256}(\text{message}))$.
4. Each participant i calculates their own signature share $s_i$:

$$s_i = k_i^{-1}(e + a_i r) \bmod n,$$

where $a_i$ is their private key share.
5. Each participant sends their signature share $(r, s_i)$ to the coordinator.
6. When the coordinator has received 2t+1 signature shares, they calculate:

$$s = \text{interpolate}(s_1, \ldots, s_{2t+1}),$$

and output the signature as (r, s).
7. The coordinator verifies the signature using the standard ECDSA verification. If this fails, at least one of the shares must be incorrect, and the signature generation algorithm should be run again.

1.12 Addition of Secrets with Different Thresholds

In the case of addition of secrets of order t and t', the addition of the two secrets requires max (t, t')+1 number of shares to calculate it. The reason behind this is that the addition step of the shares of the shared secrets creates a share of a new polynomial. This new additive polynomial is equivalent to the result of the addition of the individual polynomials of the two shared secrets. Adding two polynomials is adding the corresponding coefficients at each order of x. Therefore, the order of the additive polynomial must be the same order as the highest order of the two polynomials. This can be generalised to the addition of more than two polynomials, where the order of the resulting polynomial is the same as the order of the highest order individual polynomial.

Once the addition of two secrets with different thresholds has been calculated, the security of the higher threshold secret is reduced. This is because if one now knows the result (a+b) with respective thresholds t, t' and assume that t<t', then one can calculate a with t shares, and then calculate (a+b)−a=b, and so the value b has been calculated with only t shares. This lower threshold is referred to below as the 'implicated threshold' of b.

1.13 Multiplication of Secrets with Different Thresholds

In the case of multiplication of two secrets with a threshold of t and t', the calculation of the multiplication requires t+t'+1 shares. In this case, the multiplication of shares of two polynomials results in a share on a new polynomial. This new polynomial is the result of multiplying the two individual polynomials and so the order of the result is the addition of the order of the two individual polynomials.

Multiplication can also be generalised to any number of shared secrets, with the resulting threshold being the sum of the individual thresholds plus 1, $\Sigma_\rho t_\rho+1$, where $\rho$ runs over the individual shared secrets.

Similar to addition, the multiplication of two secrets with different thresholds results in an implicated threshold of the higher threshold secret. As before, if ab is known where a has a threshold of t and b has a threshold of t', and t<t', then both a and b can be calculated with t shares. First, one can calculate a and using $(ab)a^{-1}$ find b with only t shares of a secret.

1.14 Combining the Addition and Multiplication of Shared Secrets in One Step

It is possible to generalize the above to calculate any combination of addition and multiplication in one step. Assume a group of N participants want to calculate the result ab+c, where a, b, c are shared secrets with thresholds $(t_a+1)$, $(t_b+1)$, $(t_c+1)$ respectively. There is a condition which is $\max(t_a+t_b, t_c)<N$, that is, the number of participants of the scheme must be greater than the maximum between the order of the secret c and the order of the result of the multiplication of the secrets a and b.

1. Each participant i calculates their secret shares $a_i$=JVRSS(i), $b_i$=JVRSS(i), $c_i$=JVRSS(i) with thresholds $(t_a+1)$, $(t_b+1)$, $(t_c+1)$ respectively.
2. Each participant i calculates the share $\lambda_i=a_ib_i+c_i$.
3. Each participant i shares the result $\lambda_i$ with the other participants.
4. Each participant interpolates over $\max(t_a+t_b, t_c)+1$ shares to find the result $\lambda=\mathrm{int}(\lambda_1, \ldots, \lambda_i, \ldots)=ab+c$.

This is done in the calculation of a shared signature according to some embodiments below. That is, there is an interpolation over $s_i=k_i^{-1}(e+a_ir)$. This is essentially the case above with $a_ib_i=k_i^{-1}a_ir$ and $c_i=k_i^{-1}e$. In this case $t_a+t_b=2t$ and $t_c=t$, and interpolation is over $\max(t_a+t_b, t_c)+1=2t+1$ shares.

2. Generating Signature Shares

FIG. 1 illustrates an example system 100 for implementing embodiments of the invention. As shown, the system 100 comprises a plurality of parties (also referred to herein as "participants") 102. Only three participants 102a, 102b, 102c are shown in FIG. 1, but it will be appreciated that in general the system may comprise any number of participants. The system 100 also comprises a coordinating party 104 (or simply, "coordinator"), who may or may not also be one of the participants 102. Each of the participants 102 and the coordinating party 104 operates respective computing equipment.

Each of the respective computing equipment comprises respective processing apparatus comprising one or more processors, e.g. one or more central processing units (CPUs), accelerator processors such a graphics processing units (GPUs), other application specific processors, and/or field programmable gate arrays (FPGAs). The respective computing equipment may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The respective computing equipment may comprise at least one user terminal, e.g. a desktop or laptop computer, a tablet, a smartphone, or a wearable device such as a smartwatch. Alternatively or additionally, the respective computing equipment may comprise one or more other networked resources, such as cloud computing resources accessed via the user terminal (the cloud computing resources comprising resources of one or more physical server devices implemented at one or more sites). It will be appreciated that any act described as being performed by a party of the system 100 may be performed by the respective computing apparatus operated by that party.

Each of the participants 102 may be configured to transmit data to one, some or all of the other participants 102 over a network such as the Internet using a LAN or WAN connection, or via alternative wired or wireless communication means. Unless the context requires otherwise, reference to a participant 102 transmitting data may be understood as transmitting data to other participants 102 individually, e.g. via a secure communication channel between the first participant 102a and the second participant 102b, or broadcasting to the group as a whole, e.g. via email or other means. Again, unless the context requires otherwise, each participant 102 may transmit data in raw form, or in encrypted form. For instance, the data may be encrypted using a public key of a recipient participant before being sent to that recipient participant. The same applies to the coordinator 104 transmitting and receiving data to some, some or all of the participants 102.

Embodiments of the present invention will primarily be described from the perspective of the first participant 102a. However it will be appreciated that in general steps of the described method may similarly be performed by other participants, e.g. the second participant 102b or third participant 102c. It will also be appreciated that the terms "first", "second", "third" and so on are used herein merely as distinguishing labels and do not necessarily imply an order, unless the particular context in which the terms are used requires otherwise.

The present invention enables each participant 102 of a group of participants 102 to generate respective shares of a threshold signature, and for a coordinator 104 to generate a signature based on those signature shares. More specifically, a sub-group of the group of participants are able to generate a signature and prove that that particular sub-group generated the threshold signature.

Each participant 102 has access to (e.g. stores in memory of their respective computing equipment) a respective share of a shared private key. These private keys shares may be generated using a secret sharing scheme such as, for example, JVRSS (described above) or Shamir's Secret Sharing Scheme (SSSS). Alternative schemes for generating shares of a shared private key may be used.

The signature has a threshold, meaning at least the threshold number of different signature shares are required to generate a valid signature. It should be appreciated that any reference to "the threshold" is taken to mean a number corresponding to the threshold of the signature. For example, the threshold may be two, or three, or ten, etc. The shared private key also has a threshold. In some embodiments, the threshold of the signature is the same as the threshold of the private key. In other embodiments, the threshold of the signature is not the same as the threshold of the private key.

The group of participants 102 is divided into a plurality of sub-groups. Each sub-group is unique. Each sub-group comprises at least the threshold number of participant, i.e. the minimum number of participants in each sub-group is the same number as the threshold of the signature. In that way, each sub-group may generate a valid signature. FIG. 1 illustrates an example of dividing a group of three participants 102 into sub-groups. In this example, the threshold signature requires at least two signatures to be validly generated. As shown, one sub-group (shown by a dotted circle) comprises the first participant 102a and the second participant 102b. Another sub-group comprises the second participant 102b and the third participant 102c. Whilst not shown in FIG. 1, another sub-group may be made up of the first participant 102a and the third participant 102c. In general, the group may be divided into any number of unique sub-groups so long as each group comprises at least the threshold number of participants. In some examples, the group may be divided into all possible unique sub-groups.

The participants of each sub-group generate shares of a shared ephemeral private that is unique to that sub-group. The ephemeral private key shares may be generated using JVRSS, SSSS or an alternative scheme. Each participant 102 may also generate the inverse of their respective ephemeral private key share, e.g. using the INVSS function described above. Each participant of the group also generates an ephemeral public key, i.e. a public key corresponding to the shared ephemeral private key. As is known in the art, a public key comprises first (x) and second (y) co-ordinates and, as will be discussed below, the first co-ordinate may be used to generate a signature share. Each participant 102 may also have access to a respective message independent component (MIC) of the signature share, i.e. the signature share may be generated based on the respective MIC. The MIC itself may be generated, by a given participant 102, based on the respective private key share and the respective ephemeral private key share of that participant 102, and also the first co-ordinate of the ephemeral public key. The data required by each participant 102 to generate a respective signature share will depend on the particular form of signature that is to be generated, e.g. an ECDSA signature.

A participant may be a member of (i.e. belong to) more than one sub-group. For instance, the second participant 102b belongs to at least two sub-groups in the example of FIG. 1. Since each sub-group generates a shared ephemeral private key (i.e. the participants of each sub-group generate shares of the shared ephemeral private key), each participant that is a member of multiple sub-groups will generate multiple ephemeral private key shares, one for each sub-group. Similarly, each participant that is a member of multiple sub-groups will generate multiple ephemeral public keys, one for each sub-group.

Having generated the ephemeral private key shares and ephemeral public keys (one of each per sub-group), the participants 102 of a particular sub-group (referred to herein as a "target sub-group") can generate a signature for a message in such a way that they can prove that the signature was generated by the sub-group. Each participant of the sub-group (or at least the threshold number of participants of the sub-group, if the sub-group contains more that the threshold number) obtains a message to be signed and generates a respective signature share based on the message (e.g. a hash thereof), their respective private key share and their respective ephemeral private key share of the shared ephemeral private key generated by the target sub-group. For instance, a first participant 102a may generate a first signature share based on (i.e. as a function of) the message, a first private key share, and a first ephemeral private key share, where the first ephemeral private key share is a share of the shared ephemeral private key generated by the target sub-group. The message may have been obtained from the coordinator 104 (e.g. as part of a request for a signature share) or it may be known in advance to the first participant 102a. The other participants of the target sub-group who intend to generate a respective signature share perform an equivalent process of generating a respective signature share.

In some examples, the signature share is generated based on the inverse of the ephemeral key share. The signature share may also be generated based on the first co-ordinate of the ephemeral public key (or more specifically, the first co-ordinate mod n, where n is the order of the elliptic curve). The signature share may also be generated based on a respective MIC share.

Each participant 102 of the target sub-group may send the first signature share to the coordinator 104 for generating a signature based on at least the threshold number of signature shares. Alternatively, one of the participants (e.g. the first participant 102a) may be the coordinator 104, in which case the first participant 102a may obtain respective signature shares from respective participants, and then generate a signature based on the respective signature shares.

The coordinator 104 obtains at least the threshold number of signature shares from the sub-group. The coordinator 104 may obtain more than the threshold number, e.g. one from each participant 102.

The signature generated by the coordinator 104 comprises two components (i.e. parts). One of the components(s) is generated based on the signature shares provided by the participants 102 of the sub-group. Another component (r) is based on the ephemeral public key generated by the target sub-group. For instance, that component may be based on the x-coordinate of the ephemeral public key, e.g. the x-coordinate mod n. The complete signature may be of the form (r, s).

Since the signature is generated using signature shares that were based on ephemeral private key shares known only to the target sub-group, then only the target sub-group could have generated that signature. This can be verified by a verifying party by inspecting the component of the signature that is based on the ephemeral public key. The coordinator 104 may send the signed message to the verifying party. Only the target sub-group that is associated with ephemeral public key could have generated the signature. The verifying party may know in advance the mappings between the sub-groups and the ephemeral public keys, or the mappings may be provided by the target sub-group (e.g. by the participant 102a), or the coordinator 104. The mappings may be stored, for instance, on the blockchain.

As is discussed further below, the signed message may comprise at least part of a blockchain transaction, e.g. one or more inputs and one or more outputs of the transaction. The coordinator 104 may submit the signed transaction to the blockchain, as shown in FIG. 1.

FIG. 2 shows an example method 200 according to some embodiments of the present invention. The steps S201 to S204 are performed by a participant of the target sub-group, e.g. the first participant 102a. At step S201, the first participant 102a generates an ephemeral private key share for each sub-group that the first participant 102a belongs to, and at step S202 the first participant 102a generates a corresponding ephemeral public key. At step S203, the first participant 102a generates a signature share using a share of the shared ephemeral key derived by the target sub-group, and at step S204, the first participant 102a sends the signature share to the coordinator 104 for generating a signature.

The following provides further specific examples of the described embodiments.

A subset of participant may prove that they contributed to a signature using a process whereby all possible subsets of signers create ephemeral keys and then the signers involved create a signature using an ephemeral key of the corresponding subset.

Assume there is a group of N participants with a shared secret of threshold (t+1), and the set of all possible subsets of that group of at least size (2t+1) is given by $\mathcal{S}$, where $$\mathcal{S} = \{S \subseteq \mathcal{N} : |S| > 2t\}$$

where S is notation for some set of participants of the whole group of participants $\mathcal{N}$. Note that in some examples to prove a specific group of signers, the order of the subset |S| may be set to 2t+1, however the inclusion of other subsets of the group may be included for completeness. The group then take the following steps.

1. Each participant i in the subset $S \subset \mathcal{S}$ generates a shared ephemeral private key $k_{s_i}$=INVSS(i) for all $S \subset \mathcal{S}$.
2. All subsets $S \subset \mathcal{S}$ calculate the $r_s$ corresponding to these ephemeral private keys $k_{s_i}$.
3.

Then any signature ($r_s$, s) using this ephemeral key must necessarily be signed by the subset S.

FIG. 3 illustrates an example method 300 for generating a signature on a message according to embodiments of the invention. Steps S301 to S308 are performed by each of a threshold number of participants 102 in this example (including the first participant 102a). Step S309 is performed by a coordinator 101, who may also be one of the participants performing steps S301 to S308. It will be appreciated that some of the steps may be omitted or be performed in a different order.

The example method 300 enables the creation of a shared secret of threshold (t+1) in a group of N≥2t+1 participants, where the signing threshold is also (t+1).

Set-Up:

In step S301, each participant 102 calculates a shared private key share $a_i$ and a corresponding public key. The private key share may be generated using JVRSS as described above. At this point, each participant i has a secret key share and public key ($a_i$, P), where P is notation for the public key corresponding to the shared private key. The shared private key has a threshold of (t+1).

Pre-Calculation:

In step S302, each participant 102 calculates a shared ephemeral key share and a corresponding public key. For instance, each participant 102 may calculate a shared ephemeral key using JVRSS and the calculation of the public key given in the preliminaries. Each participant 102 may then calculate an inverse share based on the ephemeral private key. This results in each participant having an inverse share ($k_i^{-1}$, r), with a threshold of (t+1).

In step S303, each participant 102 creates two different shared blinding key shares. For instance, each participant 102 may create two shared secrets so that participant i has shares $\alpha_i$=JVRSS(i) and $\beta_i$=JVRSS(i), each shared secret having a threshold (t+1). Note that in some examples, not all of the shared secrets need to have the same threshold.

In step S304, each participant 102 calculates an intermediary share and broadcasts their intermediary share to the other participants. For instance, each participant i may calculate the intermediary share $\lambda_i = k_i^{-1} a_i r + \beta_i$. This value has a threshold of (2t+1).

In step S305, the first participant 102a calculates an intermediary value based on at least the intermediary shares. For instance, the first participant 102a may calculate the intermediary value using interpolation over (2t+1) shares $\lambda$=interpolate($\lambda_1, \ldots, \lambda_{2t+1}$)=$k^{-1}ar+\beta$.

In step S306, the first participant 102a has knowledge of (r, $k_i^{-1}$, $\lambda$, $\beta_i$) and stores this along with the private key share and corresponding public key ($a_i$, P).

Note that since a different ephemeral key is used for each signature, multiple ephemeral keys can be set up at one time, that is, steps S302 to S306 can be repeated to create multiple ephemeral keys during pre-calculation and stored for later use. These can be executed at the same time so that there are no additional rounds of communication. Note that preferably, a different value of $\alpha$ and $\beta$ should be used for each signature.

Signature Generation:

In order to sign a message msg, at least (t+1) participants must perform steps S307 and S308. In step S307, at least the threshold number of participants 102 obtain a message to be signed and calculate a message digest. For instance, a coordinator 101 may send a request to (t+1) participants to create a signature share on the message msg. Each participant i may calculate the message digest e=hash(msg). In some examples, this hash function is the double SHA-256 hash function. Alternative hash functions may be used.

In step S308, at least the threshold number of participants 102 calculate a signature share and send it to the coordinator 101. For instance, each participant i may calculate their signature share $s_i = k_i^{-1} e - \beta_i$, and then send this signature share (r, $s_i$) to the coordinator. Note that the value r may not be sent by all participants.

In step S309, the coordinator 101 calculates the signature. For instance, the coordinator 101 may calculate s=interpolate($s_1, \ldots, s_{t+1}$)+$\lambda$=$k^{-1}e+k^{-1}ar$, and finally the signature (r, s). This results in the expected signature share since the $\beta$ terms cancel. Similar variations of this protocol can be made as above describing when the $(k\alpha)^{-1}$ and r is included in the calculation.

Note that the thresholds of the secrets may be different. That is the threshold of a, k, $\alpha$, $\beta$ themselves do not necessarily need to be the same to execute the signature generation scheme. For example, if there is a group of six and three are needed to create the signature and/or private key, they could technically do the calculation with the threshold of the k being four and the thresholds of the other shared secrets being three, and they will still have a threshold-optimal scheme.

Note that the present invention may be applied to any threshold signature scheme (whether optimal or non-optimal) and is not limited to the example of FIG. 3 described above.

In general, embodiments of the present invention can be used to generate a signature on any message. As a particular example use case, as shown in FIG. 1, the message may be part or all of a blockchain transaction. That is, the signature may be used to sign one or more inputs and/or one or more outputs of a blockchain transaction. For instance, the generated signature may be used, at least in part, to unlock an output of a blockchain transaction. As a particular example, the output of a previous transaction may be a pay-to-public-key-hash (P2PKH) output which is locked to a hash of a public key. In order to be unlocked, an input of a later transaction that references the P2PKH output needs to include the (unhashed) public key and a signature generated based on the private key corresponding to the public key. The coordinator 104 may sign the blockchain transaction and submit the signed transaction to one or more blockchain nodes of a blockchain network 106.

Represented in script, the "locking script" and "unlocking script" may take the following forms:

Locking script=OP_DUP OP_HASH160<Public KeyHash>OP_EQUAL OP_CHECKSIG

Unlocking script=<Signature> <Public Key>

Referring to the above described embodiments, the <Public Key> may be equated to P=$a_{child} \cdot$ G, and the <Signature> comprises the threshold signature s, where the previous transaction is the message to be signed. Note that as stated above, ECDSA signatures are in the form (r, s).

Note that the described signature generation method is not limited to any particular use case and may in general be used for generating a signature based on any message. Signing all or part of a blockchain transaction is just one illustrative example. The described method may be used to sign and/or authorize, for instance, a legal document (e.g. a will, deed or other contract), correspondence between one or more parties, digital certificates (e.g. issued by a certificate authority), medical prescriptions, a bank transfer or a financial instrument, a mortgage or loan applications, etc.

As a particular example, the group of participants (say five participants in total) may form the board of a company. Voting matters of the company may require a majority of the board (i.e. at least three participants) to agree on the particular vote. The board may use the described signature generation method to prove that at least three board members agreed to vote in favour of a particular outcome. In this example, the threshold of the signature generation scheme is three. That is, at least three of the board members must provide a respective signature share in order for the co-ordinator to successfully generate a signature. If a signature is generated successfully, at least the threshold number (i.e. three) of board members must have agreed to vote in favour of that outcome. Thus the successful generation of a signature acts as a record of the vote and proves that a majority of the board voted in a particular way.

Another use case for the present invention lays in the field of digital certificates, e.g. digital certificate issued by the X.509 standard. A digital certificate contains a signature that signs over some data. The data can in general be any data, but one particular example of data included in a digital certificate is a public key. A public key in a digital certificate is often referred to as a "certified public key". The issuer of the digital certificate (a "certificate authority") may perform one or more checks on the owner of the public key (e.g. know-your-customer checks), and if the checks are successful, the certificate authority issues a digital certificate that includes the certified public key. A user can use a certified public key to prove they are who they say they are, e.g. by signing a message with a private key corresponding to the certified public key. One particular use for certificate authorities is to sign certificates used in HTTPS for secure browsing on the internet. Another common use is in issuing identity cards by national governments for use in electronically signing documents. The certificate authority signs the public key (or any other data to be attested to) using a private key.

As stated above, embodiments of the present invention may involve encrypting a message with a public key corresponding to a private key share, and similarly decrypting the message with a private key share. In that case, the first participant 102a may decrypt the message that has been encrypted by a different party. As another option, a message may be encrypted with a public key corresponding to a full private key, e.g. a full child key. In that case, at least a threshold number of participants may make their respective shares of the child private key available in order to decrypt the message. The message that is encrypted may comprise some or all of a blockchain transaction, e.g. encrypted data may be included in a transaction to be recorded on the blockchain.

CONCLUSION

Other variants or use cases of the disclosed techniques may become apparent to the person skilled in the art once given the disclosure herein. The scope of the disclosure is not limited by the described embodiments but only by the accompanying claims.

It will be appreciated that the above embodiments have been described by way of example only. More generally there may be provided a method, apparatus or program in accordance with any one or more of the following Statements.

Statement 1. A computer-implemented method, performed by a first participant of a group of a participants, of proving that a target sub-group of the group generated a digital signature, wherein the signature can only be generated based on at least a threshold number of respective signature shares, wherein each participant of the group has a respective private key share of a shared private key, wherein the group is divisible into a plurality of unique sub-groups where each sub-group comprises at least the threshold number of participants, and wherein the method comprises:
for each respective sub-group to which the first participant belongs, generating a respective first ephemeral private key share of a respective shared ephemeral private key, wherein each other participant of each respective sub-group generates a respective ephemeral private key share of the respective shared ephemeral private key;
for each respective shared ephemeral private key, generating a respective shared ephemeral public key;
generating a first signature share of the signature, wherein the first signature share is generated based on a first private key share of the shared private key, the first ephemeral private key share of a target one of the respective shared ephemeral private keys, and a message; and
making the first signature share available to a coordinator for generating the signature based on at least the threshold number of respective signature shares, wherein each respective signature share is based on respective private key share of the shared private key and a respective ephemeral private key share of the target one of the respective shared ephemeral private keys, and wherein the signature comprises a component based on the respective shared ephemeral public key corresponding to the target one of the respective shared ephemeral private keys.

Statement 2. The method of statement 1, wherein the first participant is the coordinator, and wherein the method comprises:
obtaining at least the threshold number of respective signature shares; and
generating the signature based on at least the threshold number of respective signature shares.

Statement 3. The method of statement 1 or statement 2, comprising:
making available, to a verifying party, a list of respective participants belonging to the sub-group associated with the respective shared ephemeral public key corresponding to the target one of the respective shared ephemeral private keys.

Statement 4. The method of statement 3, comprising sending the message to the verifying party.

Statement 5. The method of any preceding statement, wherein the message comprises at least part of a blockchain transaction.

Statement 6. The method of statement 2 and statement 5, comprising submitting the blockchain transaction to one or more nodes of a blockchain network.

Statement 7. The method of any preceding statement, wherein the message comprises a digital certificate.

Statement 8. The method of any preceding statement, wherein each respective first ephemeral private key share is generated using a joint verifiable secret sharing scheme.

Statement 9. The method of any of statements 1 to 7, wherein each respective first ephemeral private key share is generated using Shamir's secret sharing scheme.

Statement 10. The method of any preceding statement, wherein the group is divided into all possible unique sub-groups.

Statement 11. Computer equipment comprising:
memory comprising one or more memory units; and
processing apparatus comprising one or more processing units, wherein the memory stores code arranged to run on the processing apparatus, the code being configured so as when on the processing apparatus to perform the method of any of statements 1 to 10.

Statement 12. A computer program embodied on computer-readable storage and configured so as, when run on computer equipment, to perform the method of any of statements 1 to 10.

According to another aspect disclosed herein, there may be provided a method comprising the actions of the coordinating party and the first participant.

According to another aspect disclosed herein, there may be provided a system comprising the computer equipment of the coordinating party and the first participant.

The invention claimed is:

1. A computer-implemented method, performed by a first participant of a group of a participants, of proving that a target sub-group of the group generated a digital signature, wherein the signature can only be generated based on at least a threshold number of respective signature shares, wherein each participant of the group has a respective private key share of a shared private key, wherein the group is divisible into a plurality of unique sub-groups where each sub-group comprises at least the threshold number of participants, and wherein the method comprises:
for each respective sub-group to which the first participant belongs, generating a respective first ephemeral private key share of a respective shared ephemeral private key, wherein each other participant of each respective sub-group generates a respective ephemeral private key share of the respective shared ephemeral private key;
for each respective shared ephemeral private key, generating a respective shared ephemeral public key;
generating a first signature share of the signature, wherein the first signature share is generated based on a first private key share of the shared private key, the first ephemeral private key share of a target one of the respective shared ephemeral private keys, and a message; and
making the first signature share available to a coordinator for generating the signature based on at least the threshold number of respective signature shares, wherein each respective signature share is based on respective private key share of the shared private key and a respective ephemeral private key share of the target one of the respective shared ephemeral private keys, and wherein the signature comprises a component based on the respective shared ephemeral public key corresponding to the target one of the respective shared ephemeral private keys.

2. The method of claim 1, wherein the first participant is the coordinator, and wherein the method comprises:
obtaining at least the threshold number of respective signature shares; and
generating the signature based on at least the threshold number of respective signature shares.

3. The method of claim 1, comprising:
making available, to a verifying party, a list of respective participants belonging to the sub-group associated with the respective shared ephemeral public key corresponding to the target one of the respective shared ephemeral private keys.

4. The method of claim 3, comprising sending the message to the verifying party.

5. The method of claim 1, wherein the message comprises at least part of a blockchain transaction.

6. The method of claim 2, wherein the message comprises at least part of a blockchain transaction, and wherein the method comprises submitting the blockchain transaction to one or more nodes of a blockchain network.

7. The method of claim 1, wherein the message comprises a digital certificate.

8. The method of claim 1, wherein each respective first ephemeral private key share is generated using a joint verifiable secret sharing scheme.

9. The method of claim 1, wherein each respective first ephemeral private key share is generated using Shamir's secret sharing scheme.

10. The method of claim 1, wherein the group is divided into all possible unique sub-groups.

11. Computer equipment comprising:
memory comprising one or more memory units; and
processing apparatus comprising one or more processing units, wherein the memory stores code arranged to run on the processing apparatus, the code being configured so as when run on the processing apparatus, the processing apparatus performs a method, performed by a first participant of a group of a participants, of proving that a target sub-group of the group generated a digital signature, wherein the signature can only be generated based on at least a threshold number of respective signature shares, wherein each participant of the group has a respective private key share of a shared private key, wherein the group is divisible into a plurality of unique sub-groups where each sub-group comprises at least the threshold number of participants, and wherein the method comprises:
for each respective sub-group to which the first participant belongs, generating a respective first ephemeral private key share of a respective shared ephemeral private key, wherein each other participant of each respective sub-group generates a respective ephemeral private key share of the respective shared ephemeral private key;
for each respective shared ephemeral private key, generating a respective shared ephemeral public key;
generating a first signature share of the signature, wherein the first signature share is generated based on a first private key share of the shared private key, the first ephemeral private key share of a target one of the respective shared ephemeral private keys, and a message; and
making the first signature share available to a coordinator for generating the signature based on at least the threshold number of respective signature shares, wherein each respective signature share is based on respective private key share of the shared private key and a respective ephemeral private key share of the target one of the respective shared ephemeral private keys, and wherein the signature comprises a component based on the respective shared ephemeral public key corresponding to the target one of the respective shared ephemeral private keys.

12. A computer program embodied on non-transitory computer-readable storage media and configured so as, when run on computer equipment, the computer equipment performs a method, performed by a first participant of a group of a participants, of proving that a target sub-group of the group generated a digital signature, wherein the signature can only be generated based on at least a threshold number of respective signature shares, wherein each participant of the group has a respective private key share of a shared private key, wherein the group is divisible into a plurality of unique sub-groups where each sub-group comprises at least the threshold number of participants, and wherein the method comprises:

for each respective sub-group to which the first participant belongs, generating a respective first ephemeral private key share of a respective shared ephemeral private key, wherein each other participant of each respective sub-group generates a respective ephemeral private key share of the respective shared ephemeral private key;

for each respective shared ephemeral private key, generating a respective shared ephemeral public key;

generating a first signature share of the signature, wherein the first signature share is generated based on a first private key share of the shared private key, the first ephemeral private key share of a target one of the respective shared ephemeral private keys, and a message; and making the first signature share available to a coordinator for generating the signature based on at least the threshold number of respective signature shares, wherein each respective signature share is based on respective private key share of the shared private key and a respective ephemeral private key share of the target one of the respective shared ephemeral private keys, and wherein the signature comprises a component based on the respective shared ephemeral public key corresponding to the target one of the respective shared ephemeral private keys the method of claims 1 to 10.

* * * * *